United States Patent [19]
Bernstein

[11] Patent Number: 4,941,540
[45] Date of Patent: Jul. 17, 1990

[54] UNIVERSAL ELECTRIC WHEELED CHAIR

[76] Inventor: Lawrence A. Bernstein, 6456 Surfside Way, Malibu, Calif. 90265

[21] Appl. No.: 317,194

[22] Filed: Feb. 28, 1989

Related U.S. Application Data

[63] Continuation of Ser. No. 924,895, Oct. 30, 1986, Pat. No. 4,825,971, which is a continuation-in-part of Ser. No. 691,168, Jan. 14, 1985, abandoned.

[51] Int. Cl.$^5$ ............................................. A61G 5/02
[52] U.S. Cl. .................................. 180/65.1; 180/68.5; 180/907; 280/42; 280/657; 280/250.1
[58] Field of Search ...................... 180/907, 68.5, 65.1; 280/250.1, 304.1, 42, 657, 658

[56] References Cited

U.S. PATENT DOCUMENTS

| | | | |
|---|---|---|---|
| 675,390 | 6/1901 | Keating | 180/68.5 |
| 3,613,813 | 10/1971 | Biddle | 180/907 |
| 3,893,529 | 7/1975 | Karchak, Jr. | 180/907 |
| 4,323,133 | 4/1982 | Williams | 180/907 |
| 4,477,098 | 10/1984 | Minnebraker | 280/42 |
| 4,671,524 | 6/1987 | Haubenwallner | 180/907 |
| 4,759,418 | 7/1988 | Goldenfeld et al. | 180/907 |
| 4,825,971 | 5/1989 | Bernstein | 180/907 |

FOREIGN PATENT DOCUMENTS

| | | | |
|---|---|---|---|
| 2248678 | 5/1975 | France | 180/907 |
| 2380772 | 10/1978 | France | 180/907 |
| 1435539 | 5/1976 | United Kingdom | 280/657 |
| 2050270 | 1/1981 | United Kingdom | 180/68.5 |

*Primary Examiner*—David M. Mitchell
*Attorney, Agent, or Firm*—Poms, Smith, Lande & Rose

[57] ABSTRACT

A lightweight universal electric wheeled chair is formed of hollow tubular frame members. The seat is preferably cantilevered from rear frame members. The frame includes two lower side frame members, each of which has relatively small wheels mounted at both ends. The frame also includes two rear frame members, pivotally connected together intermediate their ends to form an "X" configuration with the lower ends of each of the rear frame members being pivotally secured to the rear ends of the lower side frame members. The front of the two lower side members are coupled together using two frame members and linear bearings intercoupling the two frame members to permit adjustment and collapsing of the wheeled chair. Two upper side members extend forwardly from the rear of the wheeled chair, and are secured to the rear frame members. A seat may be supported directly on these two upper side frame members or the two upper side frame members may serve as arms for the wheelchair, with the seat being slung from these arms at a lower position. Motor and gearing arrangements are provided for varying the distance between the two side members to change the height of the seat. When the lower side members are at their maximum separation, the pivoted rear frame members are very nearly parallel and horizontal. Nickel-cadmium batteries may be mounted in the tubular frame and of the wheeled chair, and each of the rear wheels is provided with a small electric motor aligned with and coupled to each rear wheel through appropriate gear reduction assemblies.

8 Claims, 8 Drawing Sheets

UNIVERSAL ELECTRIC WHEELED CHAIR

RELATED APPLICATIONS

This is a continuation of my prior U.S. Pat. application Ser. No. 924,895, filed Oct. 30, 1986, now U.S. Pat. No. 4825971, which in turn is a continuation-in-part of my prior U.S. Pat. application Ser. No. 691,168, filed Jan. 14, 1985, now abandoned.

BACKGROUND OF THE INVENTION

Previously proposed electric powered wheelchairs have normally used lead-acid storage batteries weighing from 35 to 65 pounds, and substantial size motors for powering the wheelchair. In addition, most prior wheelchairs are custom made for the particular individual, with a height and width dimensioned to suit the physical configuration of the expected user of the wheelchair. It is also noted that the electric wheelchairs which have been proposed heretofore have been relatively heavy and bulky, and do not lend themselves to collapsing to an easy storage configuration.

In view of the foregoing, various objects of the present invention include the following:

1. One object of the present invention is to provide a lightweight electric wheelchair wherein the batteries only weigh a dozen pounds or so and wherein the batteries may be re-charged in one-half hour to one hour.

2. Another object of the present invention is to provide a wheelchair in which the width of the wheelchair between the side arms may be readily varied by the person using the wheelchair, while the wheelchair is being used, and wherein the height of the seat of the wheelchair may be easily changed.

3. Full collapsibility of an electric wheelchair is another important object of the invention.

SUMMARY OF THE INVENTION

In accordance with one aspect of the present, a lightweight universal wheeled chair includes a frame having two lower side frame members, with wheels mounted at both ends thereof, and two rear frame members pivotally connected together intermediate there ends to form an "X" configuration, with the lower ends of each of the rear frame members being pivotally secured to the rear ends of the lower side frame members. In addition, two forwardly extending upper side members are provided, with these upper side frame members being mechanically secured to the upper ends of the two rear frame members. With regard to the arms and seat of the wheelchair, they may be arranged in one of two alternative ways. As one alternative, the forwardly extending upper side members may be the wheelchair arms, and the seat may be supported by a sling from these arms. As another alternative, two sets of forwardly extending upper frame members may be provided, with the upper pair constituting the arms of the wheeled chair, and the lower pair of forwardly extending frame members constituting the support for the seat. As an important feature of the invention, arrangements are provided for changing the spacing of the side members, thereby causing the "X" configuration rear frame members to pivot about their central pivot point and have the arms of the wheelchair come closer or farther apart, and correspondingly raise and lower the height of the seat. Further, when the side members are spread apart to their fullest separation, the rear frame members are very nearly parallel and horizontal, for ease in storage.

In accordance with another aspect of the invention, nickel cadmium batteries may be mounted within the frame members of the wheeled chair, and small size motors may be coupled to the rear wheels of the assembly through a gear reduction arrangement. Using this type of arrangement, only about 11½ or 12 pounds of batteries are required to power the wheelchair for three to four hours on a flat, level, hard surface. In addition, it only requires one-half hour to one hour to re-charge the nickel-cadmium batteries, and this may be accomplished with a small lightweight battery charger.

Other features of the invention may involve one or more of the following:

1. The front ends of the lower side members may be coupled together with a combination of frame members and linear bearings, to maintain alignment of the lower side frame members.

2. In accordance with another aspect of the invention, the rear frame members are the only structural members intercoupling the seat and the arms with the lower side frame members, so that the seat is cantilevered from the rear to provide a resilient torsion bar-type suspension for comfortable support of the user of the wheeled chair.

Advantages of the new wheelchair include the fact that it is very lightweight, with the estimate of its weight including batteries being approximately 50 to 62 pounds. An additional advantage, of course, is the fact that it may be readily adjusted in height, from kitchen counter-top level to a much lower desk height level. The unit collapses to approximately 12 inches by 26¼ inches when viewed from the rear, with the length variable depending on different models which may be employed, so that it may easily fit into the back seat or trunk of a small car.

Other objects, features and advantages will become apparent from a consideration of the following detailed description and from the accompanying drawings. Incidentally, the subject matter of FIGS. 1 through 11 and the associated detailed description was included in the parent patent application, Serial No. 691,168; and at the present time, the preferred embodiment is disclosed in the subsequent figures of the drawing and associated description.

BRIEF DESCRIPTION OF THE DRAWINGS

Having thus described the invention in general terms, reference will now be to the accompanying drawings in which:

DETAILED DESCRIPTION

Figure 1:
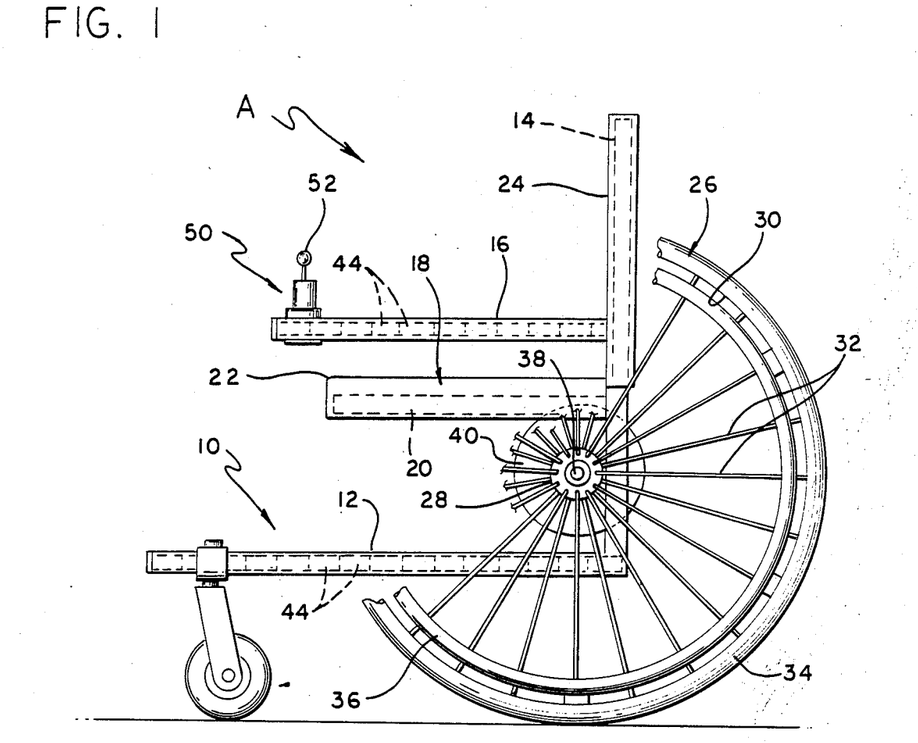
FIG. 1 is a side elevational view of a wheelchair illustrating an early embodiment of the present invention.
Figure 2:
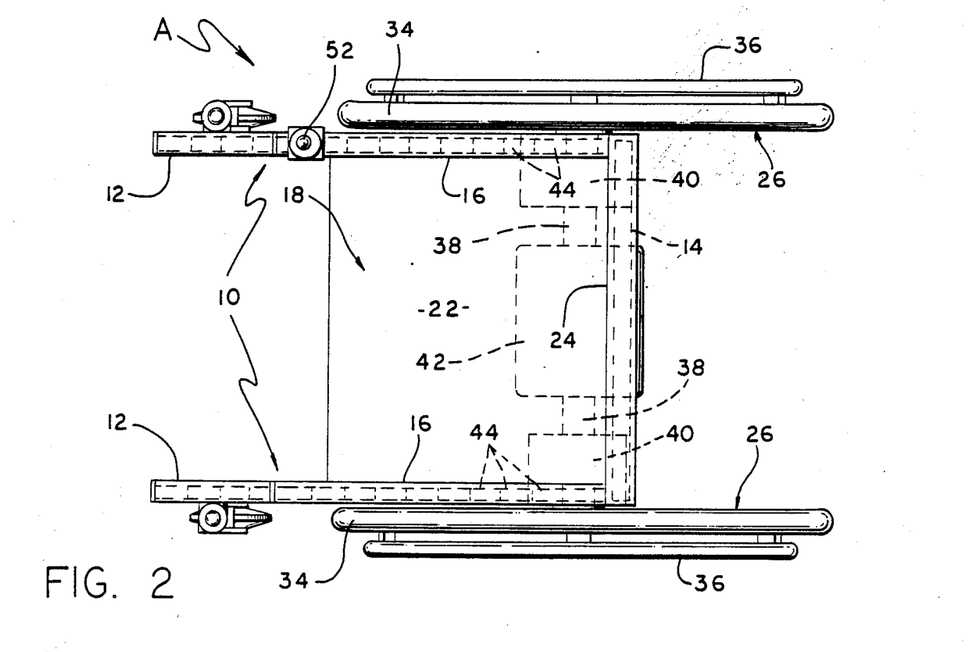
FIG. 2 is a top plan view of the wheelchair of FIG. 1.

Referring now in more detail and by reference characters to the drawings which illustrate one embodiment of the present invention, A designates a wheelchair comprised of a main frame 10 having a pair of spaced apart longitudinally extending lower frame members 12. These lower frame members 12 are connected at their rearward ends by a rear frame section 14. A pair of arms 16 are connected to the rear frame section 14 and are designed to support the arms of the user of the wheelchair. A conventional seat structure 18 is provided on the wheelchair. This seat structure 18 includes a pair of laterally spaced apart longitudinally extending seat frame members 20, and which support a suitable seat cushion 22. A back supporting cushion 24 also forms part of the seat structure 18.

The wheelchair A is further provided with a pair of enlarged driving wheels 26, each of which include a central hub 28 and a rim 30 connected by a plurality of spokes 32. A conventional tire 34 is mounted on the rim 30. It should be understood that the driving wheels 26 are usually the rear wheels of a wheelchair in a conventional construction. However, it should also be understood that the driving wheels do not have to be enlarged in the manner as shown. In addition, a circular hand grip 36 may also be provided for engagement by the hands of a user to propel the wheelchair. In addition to the foregoing, the hand grip would be provided in the event that there was a failure in the electrical driving circuit. However, for this purpose, a means would be provided to disconnect the electrical circuit to prevent self propelling against the back EMF of the motor.

Figures 3, 4, 5, 7, 8:
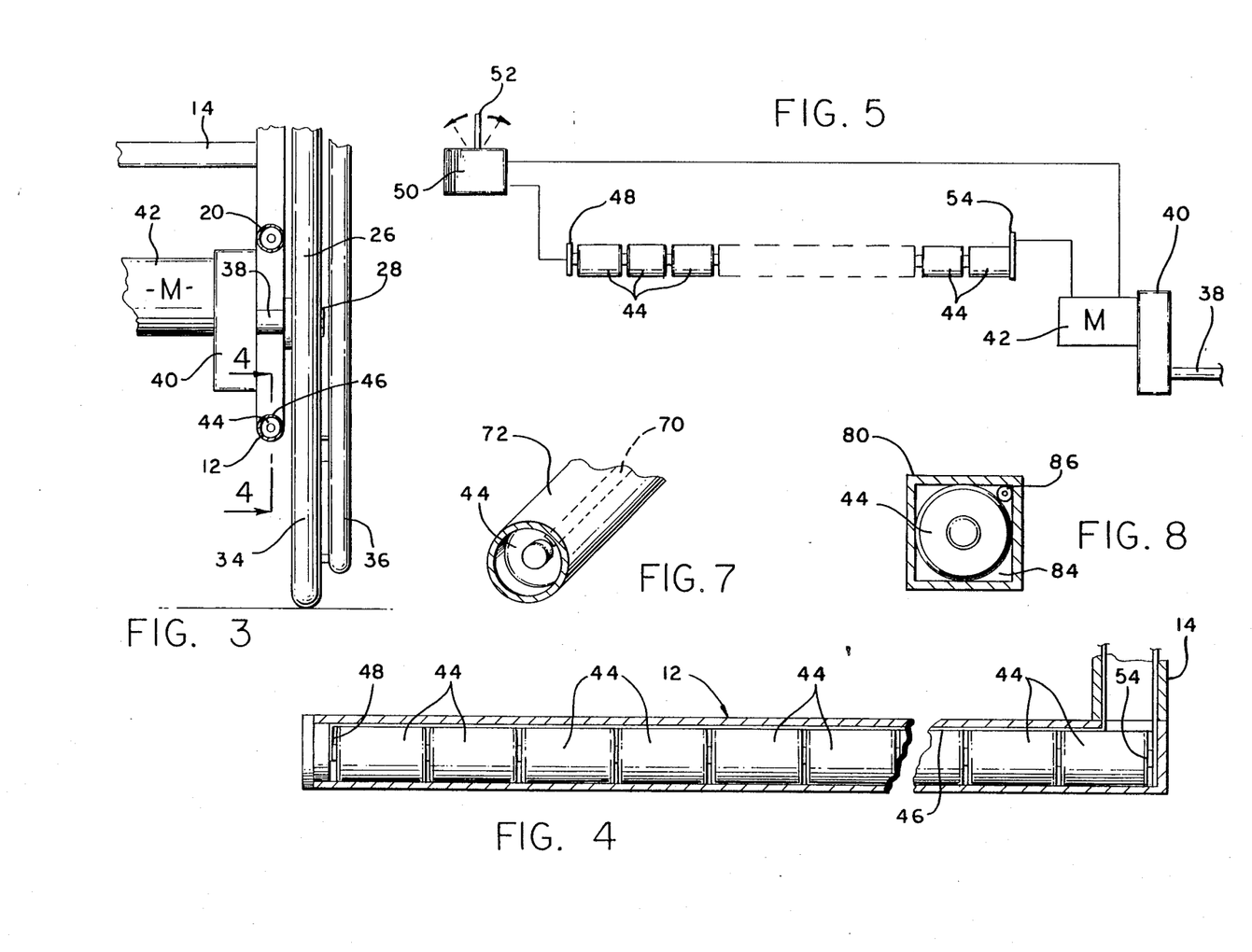
FIG. 3 is an enlarged fragmentary front elevational view and showing a portion of the drive mechanism forming part of the wheelchair.
FIG. 4 is a vertical sectional view taken along line 4—4 of FIG. 3 and showing a plurality of dry-cell cell batteries located in a frame member forming part of the frame of the wheelchair.
FIG. 5 is a schematic electrical circuit which may be showing a driving circuit used in the wheelchair.
FIG. 7 is a fragmentary perspective view of a modified form of a wheelchair construction.
FIG. 8 is a vertical sectional view of another modified form of a wheelchair.

Referring now in more detail to FIG. 3, it can be observed that the driving wheels 26 include an axle 38 which is secured within the hub 28 and is connected to a gear reducing mechanism or so-called "speed-reducer" 40 which is, in turn, connected to a conventional electrical motor 42. In this case, the electrical motor 42 may be secured to a portion of the frame of the wheelchair, such as the rear section 14. The speed reducer 40 conventionally forms a part of the electric motor 42 and is designed for coupling to the axle 38.

In the embodiment of the invention as illustrated, a plurality of dry celled batteries 44, such as C-cell or D-cell batteries, are located within the longitudinally extending frame members 12. Furthermore, the socalled "F-cell" batteries may also be employed and which are generally elongate D-cell batteries. In this case, the frame members are constructed of a circular cross-sectional shape and size at least sufficient to accommodate the C-cell or D-cell or F-cell batteries 44. In the embodiment as illustrated, it can be observed that at least ten of such batteries can be located within one of the longitudinally extending frame members 12 and ten additional dry celled batteries can be located within the other and opposite longitudinally extending frame member 12. Furthermore, it can also be observed that at least five endwise abutted batteries can be longitudinally located within each of the arm sections 16 and five endwise abutted batteries can be longitudinally located in each of the seat frame members 20 which form part of the frame of the wheelchair.

It has been found in connection with the present invention that forty of such dry cell batteries are more than sufficient to provide at least that driving power in an amount which is at least equivalent to that provided by a conventional automotive type wet cell battery such as a six-celled wet cell automotive type battery. Moreover, it has been found that the use of this number of dry celled batteries actually creates significantly less overall weight to the wheelchair than one driven by one or two conventional automotive type wet-celled batteries.

A conventional wheelchair which is powered by either one or two wet cell batteries of the type normally used in automotive vehicles generally weighs in the range of about 125 to about 225 pounds. Each wet celled battery itself, depending upon the particularly battery employed, can weigh as much as 35 pounds. However, a wheelchair which is constructed in accordance with the present invention and which utilizes 40 dry celled batteries weighs approximately 50 to 62 pounds including the weight of the batteries. The batteries weigh approximately 12 pounds and therefore, the overall wheelchair of the present invention without batteries may weigh only within the range of 38 to 50 pounds.

If additional battery power is required, batteries can also be located in or on other portions of the wheelchair. For example, the vertically disposed back support bars which support a back pad can be constructed to receive the dry cell batteries. Furthermore, batteries could also be located in other portions forming part of the frame of the wheelchair of the present invention. It should be understood that a battery pack may be mounted under the seat structure 18 or on or in other portions of the vehicle. These additional battery packs could be connected in circuit, or could be used as additional batteries in case some of the batteries in the driving circuit become discharged.

The conventional wet-celled automotive-type battery normally provides about 24 ampere hours of power, but will generally range from about 21 to about 28 ampere hours depending upon the particular type of battery involved. However, generally all conventional automotive-type electrical systems including those of passenger vehicles, motorcycles and the like generally operate on 16 volt or 12 volt systems.

The wheelchair of the present invention operates on a 24 volt system as hereinafter described. This is a result of the fact that 12 volt batteries on opposite sides of the wheelchair are connected in such manner as to provide a 24 volt source. Moreover, the batteries provide 8 ampere hours at 24 volts which is effectively equivalent to approximately 16 ampere hours on a 12 volt source basis. Thus, with only 40 dry-celled batteries, the wheelchair of the present invention will provide approximately two-thirds of the normal ampere hours provided by an automotive-type wet-celled battery of the type normally employed in a four wheeled passenger vehicle.

With further reference to the embodiment of FIGS. 1–11, by adding 20 additional batteries, as for example, in other portions of the wheelchair, that is, by using 60 dry-celled batteries, the same number of ampere hours can be provided as that battery. It has been found that the 40 dry-celled batteries provide an adequate amount of power duration for use by those parties interested in using a wheelchair in a time interval between recharging, In other words, it has been found that most wheelchair use consumes 16 ampere hours or less thus providing sufficient driving power and for a duration necessary between recharging intervals.

In addition to the above, the conventional wet-cell battery can only be recharged approximately 75 times or so before the battery must be replaced. In the case of the present invention, it has been found that the dry-celled batteries can be recharged 500 times to 1,000 times before replacement is required.

In the conventional automotive wet-celled battery, it was difficult, if not dangerous for the user to carry a recharger. This was due to the fact that over charging could result in battery acid leakage or splashing and even potential explosion. However, in the case of the present invention, a re-charger can be built into the frame of the wheelchair, or otherwise, a small conventional re-charger can be hand carried and used as required due to the fact that the potential danger with re-charging the dry-cell batteries does not exist as with the wet-celled batteries.

It has also been found in connection with the present invention, that the average use of a battery powered wheelchair between re-charging intervals is approximately one to three hours, when used on a flat, hard surface. It is estimated that the wheelchair of the present invention with only forty dry celled batteries can easily achieve a three hour use between re-charging intervals.

By further reference to FIG. 4, it can be observed that the tubular members which receive the batteries 44 are also of sufficient diametrical cross-sectional size so as to receive electrical conductors 46. These electrical conductors 46 are connected to a positive end plate 48 which is located within each of the tubular frame members 12 as well as in the tubular arm frame members 16. Furthermore, the positive electrical conductors are thereupon connected to a motor controller 50 which may be conventionally mounted on one of the arms 16 of the wheelchair. This conventional motor controller 50 is provided with a so-called "joy stick" 52 for operation by the user of the wheelchair. When the joy stick is pushed forward, then forward driving power is provided to the wheelchair rear wheels 26. In like manner, when pulled to a neutral position, that is an upright position, no driving power is provided from the electric motor 42 to the driving wheels. In like manner, the controller 50 is constructed so that when the joy stick 52 is moved to the right or left, power can be provided to one or both of the right or left driving wheels as may be desired.

In the embodiment of the invention as illustrated, one or more negative conductive plates 54 are also located in each of the tubular frame members forming part of the frame of the wheelchair. These electrical conductor plates are also connected in common and connected to the electric motor 42 thereby completing the circuit in the manner as illustrated in FIG. 5.

Figure 6:
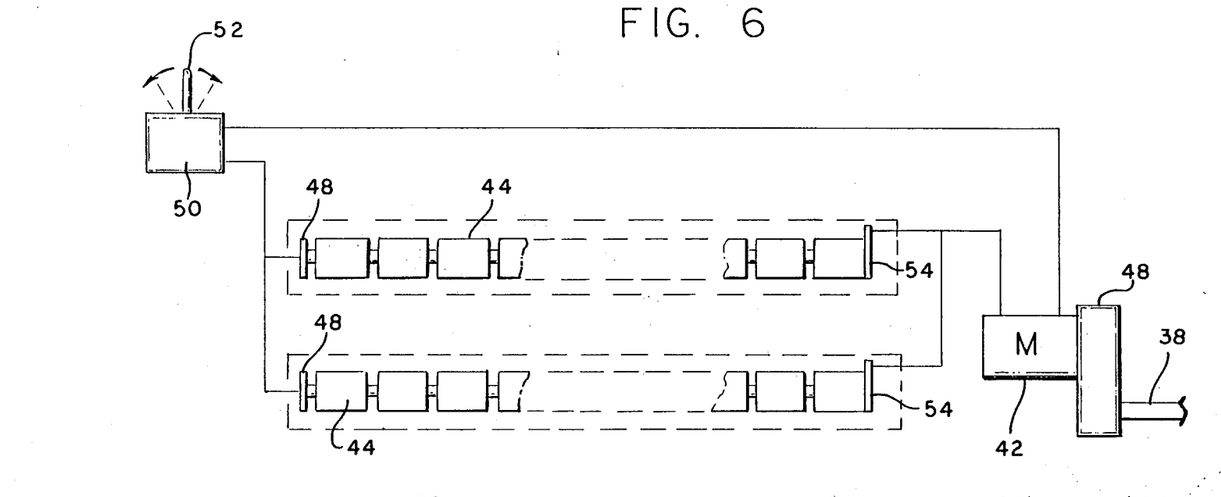
FIG. 6 is a schematic electrical circuit showing an alternate embodiment of a driving circuit used in the wheelchair.

In the embodiment of the circuit as illustrated in FIG. 5, the batteries are connected in a series circuit arrangement. This has been found to be highly efficient in many cases. However, in order to achieve a 24 volt power source for the motor 42, it has been found desirable to employ a circuit arrangement of the type illustrated in FIG. 6. In this embodiment, all of the batteries on one side of the wheelchair frame, as for example, those batteries included in the longitudinally extending frame member 12 on one side and on the seat supporting bar 18 on one side and in the arm section 16 on one side would be connected in a series arrangement. The batteries in the like three components on the opposite side would be connected in a separate series circuit arrangement. The two series circuits would then be connected in parallel in the manner as illustrated in FIG. 6 of the drawings.

FIG. 7 illustrates an embodiment of the invention in which tape-like conductors 70 are employed on the interior surface of a tubular frame member 72. In this way, the diametrical cross section of the tubular frame member 72 is sized to snugly, but nevertheless removably receive the dry cell batteries, e.g. C-cell or D-cell or F-cell batteries 74. The conductor 70 is sufficiently thin so that it does not otherwise require a larger diametrical cross section for the tubular frame member.

FIG. 8 illustrates yet another embodiment of the invention which utilizes a rectangular cross-sectional frame member 80. In this case, those frame members which are adapted to receive the batteries in the embodiment in FIGS. 1 through 4 would be of rectangular cross-sectional shape. In this way, batteries 44 can be snugly, but nevertheless receivably retained within a central bore 84 formed in the tubular member and also which will still provide sufficient room to accommodate cylindrically shaped electrical conductors 86.

It should be understood that the frame members can be constructed of other cross-sectional shapes, such as a hexagonal cross-sectional shape, a pentagonal cross-sectional shape, etc. However, the circular cross-sectional shape is preferred due to ease and cost of construction.

Figure 9:
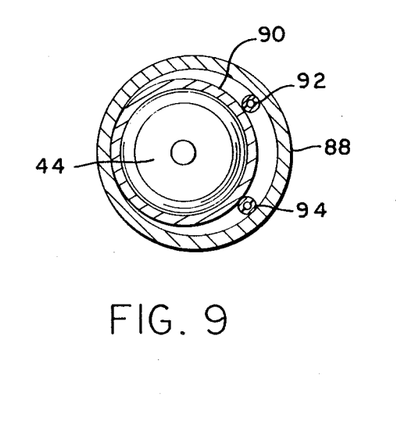
FIG. 9 is a vertical sectional view of a further modified form of a wheelchair.

FIG. 9 illustrates a further embodiment of the invention which utilizes a cylindrically shaped cross-sectional frame member 88. Mounted within the frame member 88 is a cylindrically shaped battery receiving and retaining tube 90 for receiving the dry-cell batteries 44. The inner battery retaining tube 90 could be located within the frame members 88 and spot welded or otherwise rigidly secured therein. Otherwise, the battery receiving tube 90 could be retained in any conventional fashion. The frame member 88 is of slightly larger diametrical cross section so as to accommodate electrical conductors 92 and 94. These electrical conductors 92 and 94 would be connected to respective end plates connected to the positive and negative terminals of the endwise aligned batteries.

Figure 10:
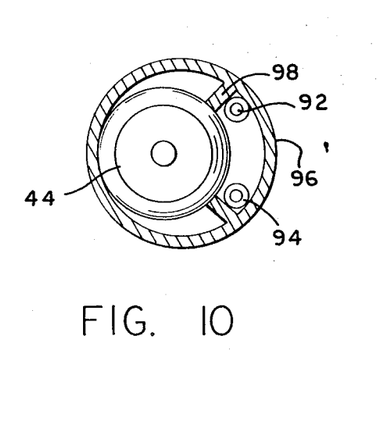
FIG. 10 is a vertical sectional view of still a further modified form of wheelchair.

FIG. 10 illustrates still a further embodiment of the invention which utilizes a frame member 96 of circular cross-sectional shape. In addition, a pair of spacers or tabs 98 are integrally formed on the interior surface of the frame member 96 for holding batteries 44 on the inside thereof. The conductors 92 and 94 are disposed on the inside of the tabs 98. It should be understood that other means of accommodating both the batteries and the electrical conductors could be employed in accordance with the present invention.

Figure 11:
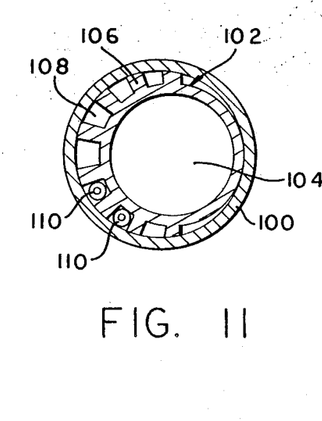
FIG. 11 is a vertical sectional view of still another modified form of wheelchair.

FIG. 11 illustrates still another embodiment of the invention which utilizes a tubular frame member 100 with an insert 102 disposed within the tubular frame member 100. In this case, the insert 102 is provided with a central bore 104 sized to receive the dry-celled batteries 44. Moreover, it can be observed that the axial center line of the bore 104 is offset from the axial center line of the tubular frame member 100. The frame member 100 is integrally provided with a plurality of spaced apart fingers 106 with grooves 108 therebetween. Moreover, the fingers 106 engage the interior surface of the side wall of the tubular frame member 100 and the recesses 108 are sized to receive electrical conductors, such as the electrical conductors 110.

As mentioned above, the foregoing description relates to the embodiment of the invention as disclosed in the original Parent patent application cited herein above. The following description relates to the new preferred embodiments of the invention as disclosed in the added figures of the drawing, starting with FIG. 12.

Figure 12:
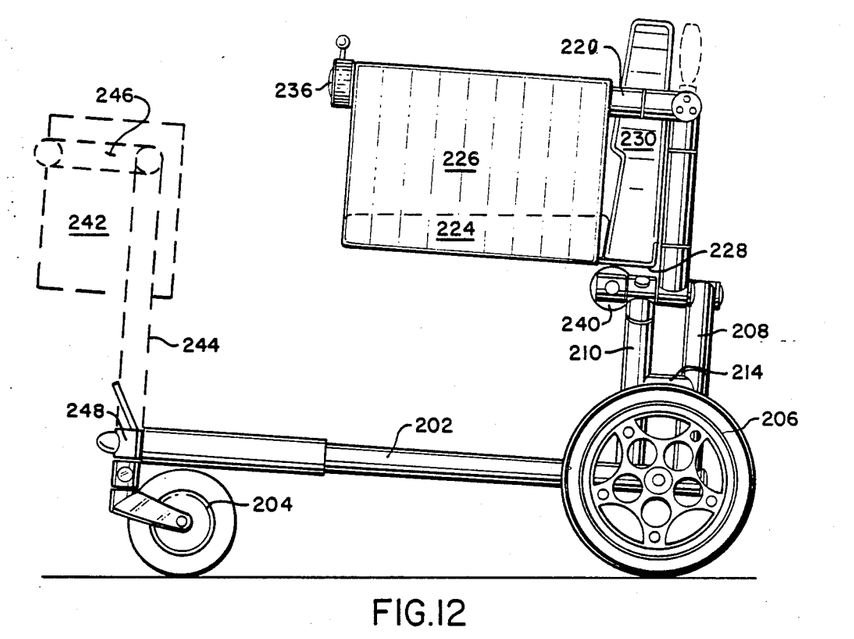
FIG. 12 is a side view of one of the preferred embodiments of the invention employing a cantilevered seat configuration, which is suspended by a sling from the wheeled chair arms.
Figure 14:
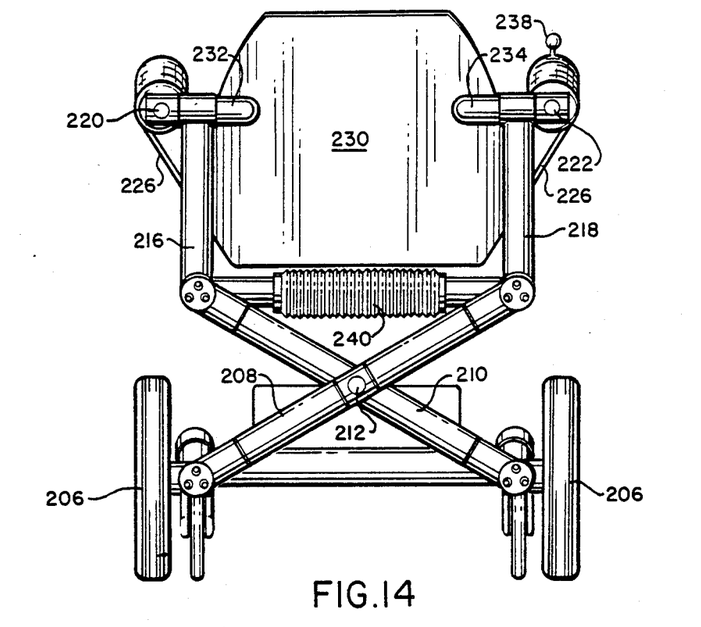
FIG. 14 is a rear view of the wheelchair of FIG. 12.

Referring now to FIG. 12 of the drawings, a lightweight universal wheeled chair assembly is shown in a side view. The wheeled chair of FIG. 12 includes a pair of lower side frame members 202, having a pair of front wheels 204 and powered rear wheels 206 connected to the lower side frame members. Pivotally secured to the rear of the side frame members 202 are the rear frame members 208 and 210, with the rear frame member 208 being behind the member 210. As best shown in FIG. 14, which is a rear view of the wheeled chair of FIG. 12, the rear frame members 208 and 210 are pivoted together at a point 212, and are interconnected by the shaft 214. Extending upwardly from the upper ends of the crossed rear frame members 208 and 210, are the vertical rear frame members 216 and 218, to which the arms 220 and 222 are respectively secured.

The seat 224 is slung by heavy material 226 from the arms 220 and 222. The seat 224 has an underlying base member and a rearwardly extending metal or plastic bracket 228 which supports the lower end of the backrest 230. The inwardly extending tubular members 232 and 234 are secured to the upper ends of the vertical rear frame members 216 and 218, and serve to hold the upper end of the backrest 230 in its proper position. At the front of the left-hand arm 220 is a flashlight 236 which may be turned on by the user for visual guidance in the dark. Secured to the front of the right-hand armrest 222 is the control lever 238 of the joystick type, for guiding the wheelchair and for selectively controlling the application of power to rear wheels 206.

Figure 15:
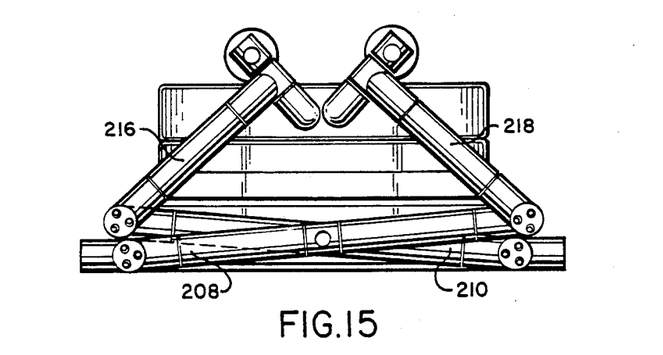
FIG. 15 is a rear view of the chair of FIGS. 12 and 14, with the wheels removed and the unit collapsed for storage.

Extending between the upper ends of the rear cross frame members 208, 210, is an assembly 240 which involves arrangements for selectively adjusting the spacing between the upper ends of members 208, 210, so that the seat may be raised or lowered, so that the arms may be spread wider apart or brought together, and so that the entire wheeled chair assembly may be entirely collapsed. Incidently, FIG. 15 shows the wheeled chair of FIGS. 12 and 14 fully collapsed, with the members 208 and 210 substantially horizontal and parallel, and the rear frame members 216 and 218 pivoted inwardly, so that the total transverse extent of the assembly is approximately 26½ inches, and its vertical extent is approximately 13 inches. This permits compact stowage in the trunk or rear seat of a car or in other locations having limited space.

Shown in dashed lines in FIG. 12 is a carrier 242 which could take the form of a heavy wire basket or the like. Carrier 242 may be supported on frame members 244 and 246 and the frame member 244 may slide into the tubular frame members 202, or into fittings 248 coupled to the front end of the lower side frame members 202. The storage compartment 242 may carry any desired equipment, for example, golf clubs, packages purchased at the super market, or the like.

Figure 13:
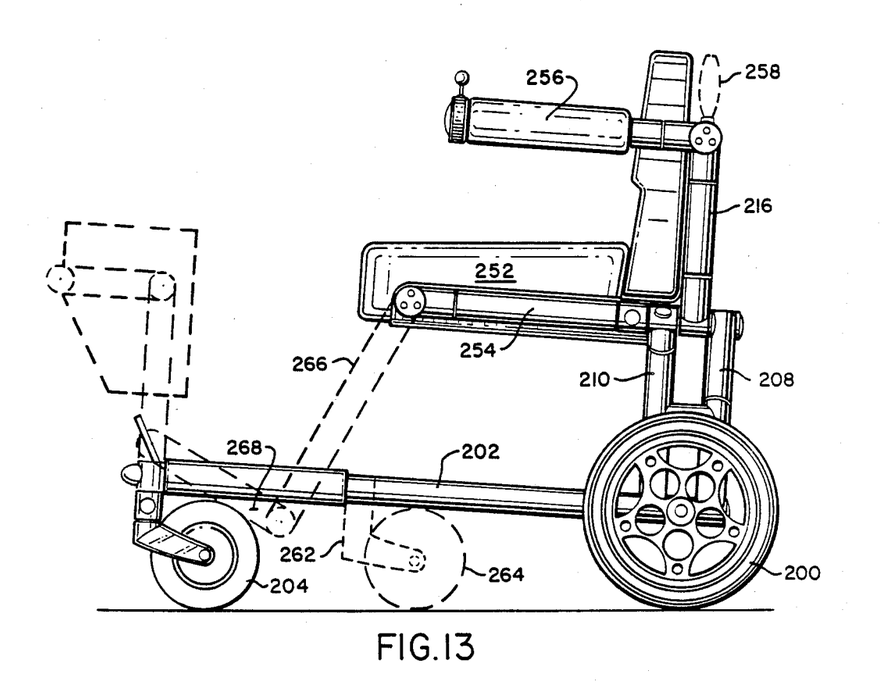
FIG. 13 is a side view of another embodiment of the invention illustrating the preferred cantilevered construction but with arms which may tilt out of the way for a side transfer of the user.

The version of the wheeled chair shown in FIG. 13, is similar to that of FIG. 12, with the exception that the seat 252 is supported on tubular frame members 254 which extend horizontally forward from the upper ends of the rear cross frame members 208 and 210. The arm 256 is padded, and pivots readily about the upper end of the frame member 216 to permit easy transfer of the user sideways from the seat 252, a step which is not practical from the sling chair of FIG. 12. If desired, a handle 258 may be secured to the arm 256 to easily tilt the arm backward and to provide easy gripping of the chair by a person manually moving the chair.

Shown in dashed lines in FIG. 13 is an alternate frame configuration including the downwardly extending frame member 262 and associated wheel 264 forming a more compact wheeled chair configuration. In addition, the leg and foot supporting frame members 266 and 268 are rotationally coupled to the front end of the frame members 254, to support the legs and feet of the user, with a multiplicity of positions for the leg and foot supporting frame members, including one for complete storage.

Figure 16:
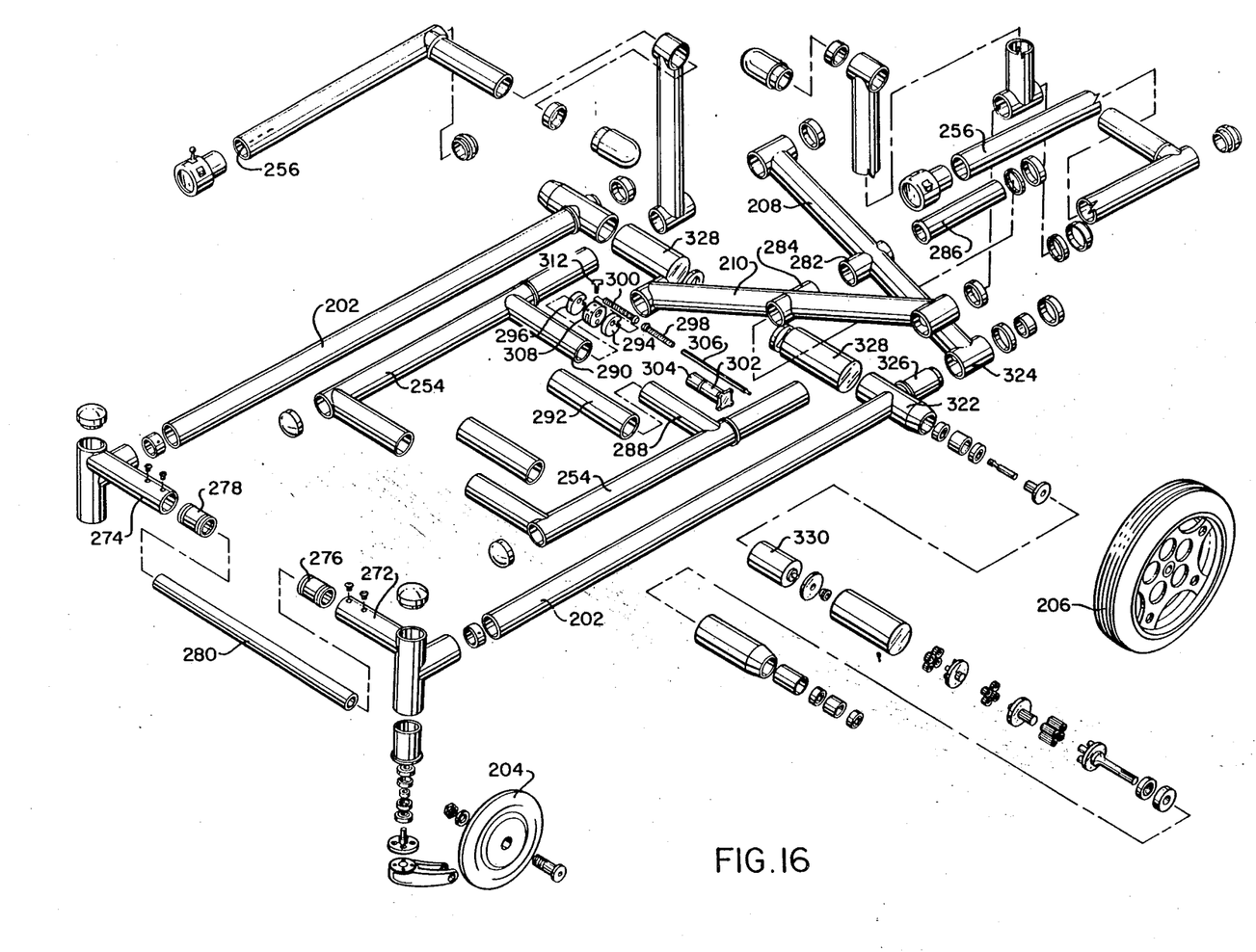
FIG. 16 is an exploded view of the embodiment of FIGS. 12 and 14, with some parts omitted, to avoid duplication.

Reference will now be made to FIG. 16 of the drawings, which is an exploded view of the embodiment of the invention shown in FIGS. 12 and 14 and discussed herein above. For the most part, the drawings are self explanatory, and the reference numerals employed in FIGS. 12 and 14 of the drawings are carried over to FIG. 16. In addition, where standard mechanical arrangements are shown, no elaborate or detailed description of the components will be made. It is further noted that, in some cases, where the parts illustrated in FIG. 16 are duplicated on both sides of the wheeled chair, one of the two members may be omitted. Thus, for example, the wheel 204 at the front left side of the assembly is shown, as is the wheel 206, but the corresponding wheels on the right side of the wheeled chair are not shown, for simplicity and to avoid unnecessary complexity of the drawings.

With regard to the interconnection of the two lower side members 202, at the rear they are intercoupled by the rear cross frame members 208 and 210. At the front of the wheeled chair, alignment of the chair assembly is maintained by the inwardly extending tubular members 272 and 274, the linear bearings 276 and 278 which are secured to the inwardly extending ends of members 272 and 274, respectively, and the inner tubular alignment member 280 which is mounted within the linear bearing units 276 and 278. With this arrangement, when the two lower side members 202 are brought closer together, or are extended, alignment at the front end of the assembly is maintained by the alignment tube 280 as it moves within the linear bearings 276 and 278, but is held in alignment with the tubes 272 and 274 by the close engagement of the ball bearings within the linear bearing members 276 and 278.

The arrangements for changing the spacing between the two lower side frame members 202, the arms 256, and the frame members 254 which underlie the seat, in the embodiment of FIGS. 13 and 16, will now be considered. In the course of changing the separation between the side frame members, the angle between the two rear cross frame members 208 and 210 is changed, with these two rear frame members pivoting about their central point corresponding to the point 212 as shown in FIG. 14. In FIG. 16, member 208 is provided with a central bearing tube member 282, the rear frame cross member 210 is provided with a similar bearing tube 284, and these two tubes are pivoted on the inner tube 286 which forms a bearing for the two pivoting members.

Figure 20:
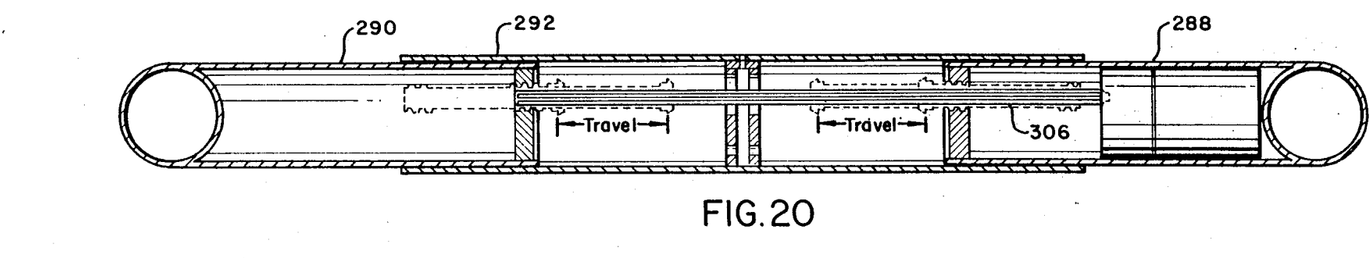
Figure 21:
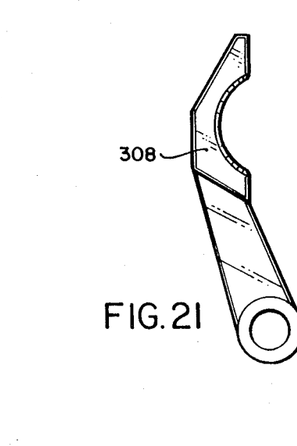
FIGS. 21 and 22 are side and front views respectively, of the clam shell nut arrangement employed in the assembly of FIGS. 19 and 20.
Figure 22:
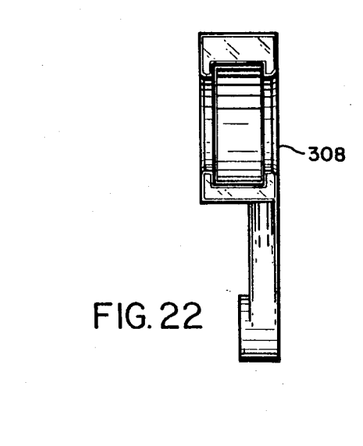
Figure 23:
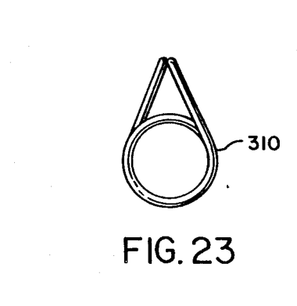
FIG. 23 is a side view of a spring employed to bias a pair of clam shell nuts as shown in FIGS. 21 and 22 into their closed position.

In order to change the spacing between the lower side frame members 202, or the seat support frame members 254, force must be applied to bring them closer together or to separate them, and this force may be applied between either the members 202 or the members 254, preferably fairly close to the rear frame members 208, 210, to avoid undue mechanical deflection. As shown in FIG. 16, force is applied to the two seat support frame members 254 by a mechanism mounted within the inwardly directed tubes 288 and 290, over which the larger diameter tube 292 slides. The mechanism which accomplishes the function under consideration may best be understood in consideration of FIGS. 19, 20, 21, 22 and 23, in combination with FIG. 16. More specifically, the mechanism includes a pair of internally threaded circular members, or nuts, 294 and 296 which are secured, respectively, into the ends of tubes 288 and 290. Threaded into these two nuts are the hollow threaded members 298 and 300, respectively, which are driven by motor 302 through a gear reduction mechanism 304 and the splined shaft 306, which extends through the two externally threaded members 298 and 300, and engages splined inner surfaces thereof to rotate these two threaded members. At the center of the assembly, mounted within the tube 292 is a "clam shell" member 308 which grips the inwardly extending heads of the threaded members 298 and 300, holding these heads in close proximity and in fixed relationship to one another, so that rotation of the splined member 306 by motor 302 forces the nuts 294, 296 and their associated tubes 288 and 290 apart or together. The clam shell member 308 is made up of two parts, as shown in FIGS. 21 and 22 and these two mating parts are normally biased together by the spring 310 as shown in FIG. 23. However, when the key 312 is turned to separate the two halves of the clam shell member 308 apart, the two worm gears may fully separate permitting full collapsing of the wheeled chair assembly, as shown in FIG. 20, and in the more complete assembly drawing discussed hereinabove, FIG. 15. It may be noted in passing that the axial position of the splined shaft 306 is fixed relative to the tubular frame member 288, and that the motor 302 and the gear reduction assembly 304 are secured within and to the tubular member 288, with the right-hand end of the splined shaft 306 always in driving engagement with the output of the gear reduction unit 304.

The motor drive for the rear wheels 206 will now be considered in greater detail. As shown to advantage in FIG. 16, the wheel 206 is mounted from the lower side frame member 202 by the tubular support member 322, along with suitable bearing and securing elements of a generally conventional nature. The rear frame member 208 is provided with a lower transverse tubular coupling member 324 which pivots on the protruding end 326 of the lower left-hand side frame member 202.

Figures 17, 18, 24:
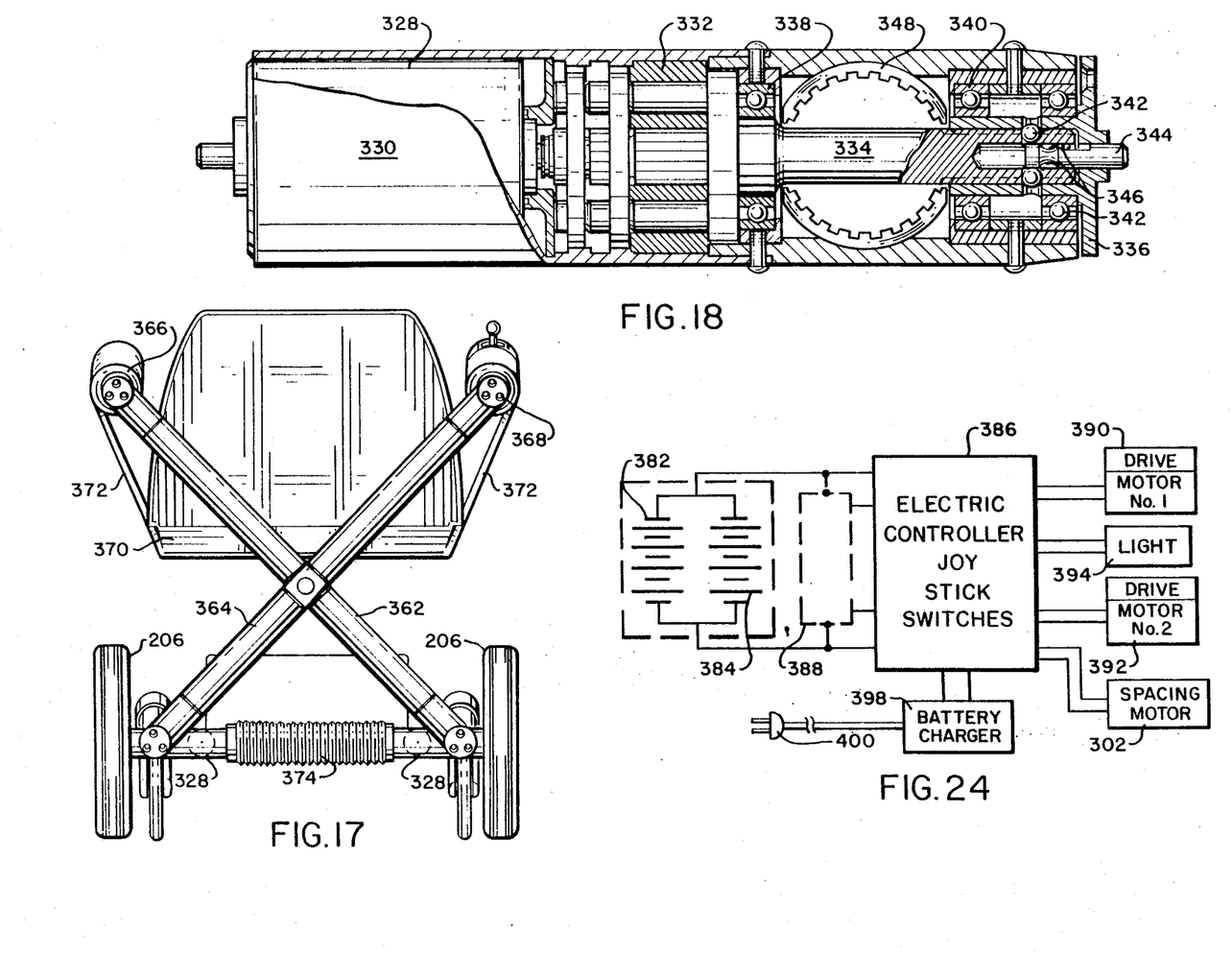
FIG. 17 is a rear view of an alternative embodiment of the invention, characterized by its simplicity, and the use of a sling type support for the seat.
FIG. 18 is a partial cross-sectional view of one of the two drive motors and the associated reduction gearing employed to drive both of the two rear wheels.
FIG. 24 is a schematic block circuit diagram of the electric circuitry for the wheeled chair.
Figure 19:
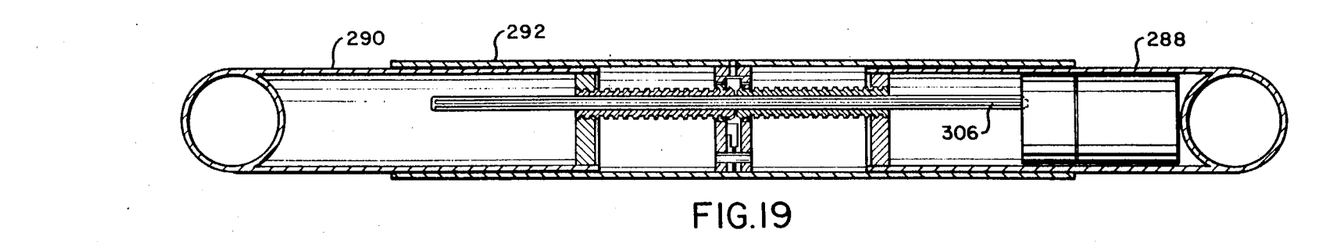
FIGS. 19 and 20 show the mechanism for changing the spacing between the two lower side frame members of the wheelchair of FIGS. 12 and 14, for example, to change the height of the seat, the spacing between the arms, and to permit collapsing of the wheelchair as shown in FIG. 15.

The details of the individual motor drive for each of the wheels 206 is shown in disassembled form in FIG. 16, and in a cross-sectional view in FIG. 18. More specifically, extending inwardly from the support member 322 is an outer housing 328, within which the high-speed motor 330 and the planetary gearing assembly 332 are mounted. The motor is a relatively high-speed and very efficient motor operating at 8400 RPM and is designated by the trade name Astro-40, made by the Astro flight company of Venice, Calif. It operates at about 8400 revolutions per minute. The planetary gear assembly is generally conventional and provides a gear reduction of approximately 64:1. The output from the gear reduction unit 332 is coupled to the power transmission shaft 334 to which the wheel hub 336 is keyed. The ball bearing inner and outer supports for the shaft 334 are shown at 338 and 340, respectively. The wheel hub 336 to which the wheel 206 is secured, is normally held in position by the outwardly extending balls 342. However, when the quick release shaft 344 is pushed inwardly, the balls 342 may extend inwardly into the recesses 346 permitting the quick release of the wheel hub 336. The cylindrical member 348 serves to couple to the members 202 and 326, the other frame members.

Consideration will now be given to FIG. 17, which is an embodiment of the invention which is significantly simpler than the other embodiments of the invention, but which has the minor disadvantage that it does not store to as compact an arrangement as that shown in FIG. 15 of the drawings. More specifically, in FIG. 17, the base configuration with the wheels 206 and the lower side frame members 202 as well as the motor housings 328 are substantially the same as in prior embodiments of the invention discussed herein above. However, the rear frame members 362 and 364 are substantially longer than the rear frame members 208 and 210 employed in prior embodiments of the invention. More specifically the upper ends of the rear frame members 362 and 364 of FIG. 17 couple directly to the arms 366 and 368, and the seat 370 is suspended by the heavy fabric material 372 directly from the arms 366. It may also be noted that the arrangements for changing the spacing between the arms 366 and 368, and the angle between the rear frame members 362 and 364, are coupled between the two lower frame members 202, instead of between the seat support members, as shown in FIG. 16 for example. Incidentally, the bellows arrangement 374 intercouples the two housings 328, enclosing the motors, which are associated with each of the two rear wheels 206.

In reviewing the wheeled chair configuration of FIG. 17, it may be noted first, that it is the simplest configuration, with the single pair of rear frame members 362 and 364, and the sling chair arrangement. It has the minor disadvantage of a somewhat larger collapsed configuration, in view of the longer length of the rear frame members 362 and 364. In addition, for seriously incapacitated persons, who must transfer from the chair laterally, the sling chair type arrangement is not suitable and the alternative configuration such as that shown in FIGS. 13 and 16 is to be preferred. The embodiment of FIG. 17 may be of particular interest for the non-disabled, or persons who are not seriously disabled, and who chose to ride rather than walk on some occasions.

Now that the structural features of the various embodiments of the invention have been considered, certain other aspects of the invention shall be reviewed for purposes of completeness. First, it is noted that the metal tubes forming the frame of the wheeled chair may be made either of aluminum or preferably of chromium-molybdenum stainless steel. Using the chrome-moly steel tubes, they have a nominal diameter of approximately 1⅜ inches. The wall thickness is preferably about 0.032 inches, but a standard wall thickness of 0.049 inch has been successfully employed. When aluminum tubes are used the wall thickness of the aluminum must be two to three times thicker, and cast junction fittings are employed for additional strength.

The batteries which are used are preferably nickel-cadmium D-cells. The motors are permanent magnet motors using ferrite magnets, or samarium cobalt magnets. The Astro -40 motors operate at about 26–28 volts, and have a 64:1 gear reduction assembly associated with each of them. Each of the nickel-cadmium battery cells provides about 1¼ volts. Accordingly 42 D-cells are provided mounted in the tubular frame members, to form two sets of 21 D-cells each, connected in series and having the desired output voltage of about 26–28 volts, and these two sets of 21 D-cells are connected in parallel.

The weight of 42 nickel-cadmium D-cells is approximately 11½ pounds. The weight of each of the two motors is about 1 to 2 pounds. The weight of the entire wheeled chairs as shown in FIGS. 12 to 23 of the drawings, ranges from about 50 to 52 pounds for the sling configurations, to about 60 to 62 pounds for the chair embodiment with frame members supporting the seat. These weight figures may be compared with conventional electric powered wheelchairs ranging from a weight of about 120 pounds for the lightest four wheeled electric wheelchairs up to about 180 to 240 pounds for the heavier electric wheelchairs. Normally, the conventional electric wheelchairs are powered by lead-acid batteries. On flat, level, hard surfaces, both the wheeled chairs of the present invention and the conventional electric wheelchairs can operate for about 3 to 4 hours. However, the nickel cadmium batteries which may be used with the present invention, may be recharged in one-half hour to one hour as compared with 12 to 14 hours for conventional lead acid battery recharging.

Further, of course, with the very lightweight, and the compact storage capability of the wheeled chairs in accordance with the current invention, many of the constraints previously inherent in electric wheel chair use have been eliminated. Thus, vehicles with lifts are not needed, and the new wheeled chairs may be lifted and stored in the trunk or back seat of a conventional automobile.

FIG. 24 is a schematic block circuit diagram of the electric circuit for the wheel chair of FIGS. 12 through 23. More specifically, FIG. 24 includes a first set of twenty-one nickel cadmium D-cells, mounted in the frame tubes, and identified by reference numeral 382. A second similar set of twenty-one cells 384 is also mounted in the frame members, and the two sets of batteries may be connected in parallel, as shown in FIG. 24, and coupled to controller 386. Another set 388 of 42 nickel cadmium D-cells may be provided in a battery pack mounted within or under the seat of the wheeled chair. The joy stick controller 238 see FIG. 14, for example, included in circuit 386, serves to apply motive power to either or both of drive motors 390 and 392. The normal operation of the joy stick, forward or back, left and right serves to selectively apply power to one or the other or to both of the drive motors; and by reversing the polarity of current applied to the motors, the wheeled chair may be backed up.

The light 394, mounted on the front of one of the arms of the wheeled chair may be turned on by a switch included in the electric controller 386. Similarly, the motor 302 may be operated in either direction to change the spacing between the side members, as discussed hereinabove.

The battery charger 398 is provided with a plug 400 connected to commercial power mains, and may be connected to charge up battery cells 382, 384 and 388 in one-half hour to one hour. The battery charger 398 is mounted within the seat back 230 as shown in FIG. 12, for example.

In conclusion, it is to be understood that the associated drawings and the foregoing accompanying detailed description relate to specific embodiments of the invention, with the embodiments shown in FIGS. 12 on, being preferred. Various modifications, such as using different materials for the frame members, and alternative mechanical arrangements for adjusting the spacing between the frame members, may of course, be employed. Accordingly, the present invention is not limited to the invention precisely as shown in the drawings and described hereinabove.

What is claimed is:

1. A lightweight electric powered wheeled chair comprising:

a tubular wheeled chair frame having two front and two rear wheels mounted on said frame, first and second small high speed motors each weighing less than two pounds mounted in alignment with and coupled to said rear wheels;

a plurality of flashlight type battery cells mounted in said tubular frame;

electric circuit means for applying power from said battery cells to said motors;

said tubular frame including two lower side frame members, two rear frame members, pivotally connected together intermediate their ends to form an "X" configuration, with the lower ends of each of said rear frame members being pivotally secured to said lower side frame members, two forwardly extending upper side members mechanically coupled to the upper ends of said rear frame members, and a seat supported from said forwardly extending upper side members; and means included in said wheeled chair assembly for permitting said rear frame members to pivot downwardly to a substantially horizontal and parallel position to form a collapsed configuration;

whereby the lightweight and collapsible configuration of said wheeled chair makes it easy to transport.

2. A wheeled chair assembly defined in claim 1 wherein said rear frame members are pivoted with respect to one another at a point which is a predetermined distance high when the wheeled chair is in the operating configuration, and wherein the wheels mounted on the back of the frame members are relatively small, having a diameter which is substantially equal to or less than said predetermined distance.

3. A wheeled chair as defined in claim 1 wherein said forwardly extending upper side members are mounted in a cantilevered manner from said rear frame members, and are supported only from said rear frame members.

4. A wheeled chair as defined in claim 1 wherein the entire weight of said wheeled chair including batteries and motors is less than eighty pounds.

5. A lightweight electric powered wheeled chair comprising:
   a tubular wheeled chair frame having two front and two rear wheels mounted on said frame;
   first and second small high speed motors each weighing less than two pounds mounted in alignment with and coupled to said rear wheels;
   a plurality of flashlight type battery cells mounted in said tubular frame;
   electric circuit means for applying power from said battery cells to said motors;
   the entire weight of said wheeled chair including batteries and motors being less than one hundred pounds; and
   said tubular frame including two lower side frame members, two rear frame members, pivotally connected together intermediate their ends to form an "X" configuration, with the lower ends of each of said rear frame members being pivotally secured to said lower side frame members, two forwardly extending upper side members mechanically coupled to the upper ends of said rear frame members, and a seat supported from said forwardly extending upper side members.

6. A wheeled chair as defined in claim 5 wherein means including a lightweight motor are provided for changing the spacing between said side frame members, and circuit means are provided for energizing said last-mentioned motor from said battery cells.

7. A lightweight electric powered wheeled chair comprising:
   a tubular wheeled chair frame having two front and two rear wheels mounted on said frame;
   first and second small high speed motors each weighing less than two pounds mounted in alignment with and coupled to said rear wheels;
   a plurality of high performance battery cells mounted in said tubular frame;
   electric circuit means for applying power from said battery cells to said motors;
   the entire weight of said wheeled chair including batteries and motors being less than one hundred pounds;
   said tubular frame including two lower side frame members, two rear frame members, pivotally connected together intermediate their ends to form an "X" configuration, with the lower ends of each of said rear frame members being pivotally secured to said lower side frame members, two forwardly extending upper side members mechanically coupled to the upper side members mechanically coupled to the upper ends of said rear frame members, and a seat supported from said forwardly extending upper side members.

8. A lightweight electric powered wheeled chair comprising:
   a tubular wheeled chair frame having two front and two rear wheels mounted on said frame, said frame being a structural frame for providing structural strength to said wheeled chair,
   first and second small high speed motors each weighing less than two pounds mounted in alignment with and coupled to said rear wheels;
   a plurality of flashlight type battery cells mounted in said structural tubular frame;
   electric circuit means for applying power from said battery cells to said motors;
   the entire weight of said wheeled chair including batteries and motors being less tan one hundred pounds; and
   battery charging means mounted on said wheeled chair for fully recharging said battery cells from their discharged state in less than one hour.

* * * * *